United States Patent [19]

Morris et al.

[11] 4,409,485

[45] Oct. 11, 1983

[54] RADIATION DETECTOR AND METHOD OF OPAQUING THE MICA WINDOW

[75] Inventors: Hayden Morris, Washington, D.C.; Charles Christianson, Laurel, Md.

[73] Assignee: The United States of America as represented by the Secretary of the Navy, Washington, D.C.

[21] Appl. No.: 308,740

[22] Filed: Oct. 2, 1981

[51] Int. Cl.$^3$ .......... G01T 1/18

[52] U.S. Cl. .......... 250/374; 313/93

[58] Field of Search .......... 250/374, 375; 313/93, 313/112, 420, 524; 427/58

[56] References Cited

U.S. PATENT DOCUMENTS

| | | | |
|---|---|---|---|
| 2,452,524 | 10/1948 | Metten | 250/374 |
| 2,837,677 | 6/1958 | Hendee et al. | 250/374 |
| 2,837,678 | 6/1958 | Hendee et al. | 313/93 |
| 2,925,509 | 2/1960 | Hayes | 313/93 |
| 2,944,176 | 7/1960 | Anton | 250/374 |
| 3,056,059 | 9/1962 | Hermsen et al. | 313/93 |
| 3,296,478 | 1/1967 | Ichinokawa | 313/420 |
| 4,158,774 | 6/1979 | Stokes | 250/374 |

*Primary Examiner*—Janice A. Howell

*Attorney, Agent, or Firm*—R. F. Beers; K. E. Walden; D. J. Breh

[57] ABSTRACT

An improved particle detection tube including a method for applying a radiation transparent electrically non-conductive, opaque to ultraviolet light coating to the mica window of the tube. The coating reduces erroneous counts by preventing arcing between the tube anode and window. A purified mineral bituminous hydrocarbon based wax coating is applied to the mica window by cleaning the window with a hydrocarbon or chlorinated solvent rinsing with isopropyl alcohol drying the window dissolving 4 to 20 milligrams of purified bituminous hydrocarbon based wax in 1 to 2 milliliters of a hydrocarbon or chlorinated solvent on the window, and rotating the tube until the solvent evaporates to produce a film of the wax thereon.

8 Claims, 1 Drawing Figure

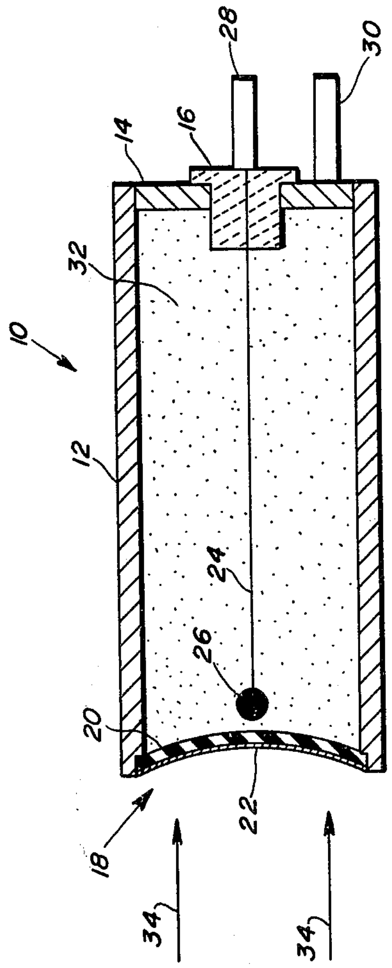
28
30
14
16
32
10
12
24
26
20
22
18
34
34

RADIATION DETECTOR AND METHOD OF OPAQUING THE MICA WINDOW

BACKGROUND OF THE INVENTION

This invention relates to radiation detection tubes for detecting beta type radiation. More particularly the invention relates to Geiger-Mueller tubes of the type having a thin mica window for admitting beta radiation. In still more particularity the invention relates to a means of reducing erroneous counts due to activation of the tube by ultraviolet light and arcing between the tube anode and window.

Geiger-Mueller tubes of the type to which this invention relates are well known and in general consist of a metallic cylinder closed on both ends. One end closure is a radiation transparent window usually of mica. An anode is formed by mounting a thin wire coaxially within the tube from the end opposite the window. A potential difference is maintained between the anode and case which functions as a cathode. The tube is filled with a gas that becomes ionized when atoms of the gas are struck by radiation particles such as beta rays. The potential difference between the anode and cathode causes the free electrons produced by the ionization to migrate to the positive anode and the positive ions to migrate to the cathode. The resulting change in charge on the anode and cathode is detected as a count of the radiation particles entering the tube.

One problem associated with this type of detector is erroneous counts due to activation of the tube by means other than beta particles. One means of activation that has been encountered is the activation of the tube by ultraviolet light near the x-ray region if allowed to enter the tube through the mica window. It has been found that means to prevent the entry of ultraviolet light into the tube has given rise to another means of tube activation and, additionally, threatens the useful life of the Geiger-Mueller tube. Coatings such as india ink and collodial graphited water solutions have been applied to the window and while they are effective in preventing the entry of ultraviolet light, they are electrically conductive, and it has been observed that electrical arcing can occur between the tube anode and the coating.

In order to make the detector sensitivity acceptable and to detect the particular particle type desired it is often necessary to place the free end of the anode wire in close proximity to the mica window, or due to manufacturing tolerances or errors the anode is located so close to the window that arcing occurs. Even when the conductive coatings are applied to the outer surface of the mica the potential difference between the anode and coating can be sufficiently high that the arc penetrates the mica to reach the conductive coating. It has been found that this arcing will saturate the tube and render it useless in measuring radiation sources. Constant arcing within the tube uses up the quenching gas and shortens the life of the tube.

Means to redirect the arc away from the window to another surface have been devised, such as that disclosed in Patent 2,452,524 for Protective Grid for Geiger Mueller Tubes to Metten; however, the arc is not eliminated but rather redirected to another surface and may still result in an erroneous count.

It can be appreciated that it is desirable to have a mica window that is not only opaque to ultraviolet light and transparent to the beta radiation to be measured, but one that also prevents arcing thereto. Additionally, it is highly desirable to provide /for a coating that can be applied to the windows of tubes, that have been improperly manufactured with their anodes so close to the window that arcing would occur if an electrically conductive coating were applied. In other words, those tubes to which opaque to ultraviolet light, conductive coatings have been applied, and which experience arcing because their anodes have been improperly positioned too close to the window during manufacture, can be salvaged by removing the conductive coating and applying the coating of this invention.

SUMMARY OF THE INVENTION

It is therefore an object of the invention to provide for a means to prevent arcing between the anode and window of a beta radiation detector tube.

It is another object of the invention to provide for the reduction of erroneous counts in beta radiation detector tubes due to arcing to the tube window.

It is another object of the invention to provide for increased beta particle detector tube life.

Another object of the invention is to provide for the salvage of detector tubes that have been rendered unusable because their anodes have been positioned sufficiently close to the window to cause arcing to a conductive coating thereon.

The objects of the invention are achieved by providing for a beta radiation transparent opaque to ultraviolet light, electrically non-conductive coating for the mica window of the detector tube. The invention discloses a method for applying such a coating in the form of a wax on the mica window which includes the steps of cleaning the window with a hydrocarbon or chlorinated solvent, rinsing the window with isopropyl alcohol, dissolving a mineral bituminous hydrocarbon based wax in a hydrocarbon or chlorinated solvent on the window and rotating the tube until the solvent evaporates.

DESCRIPTION OF THE DRAWING

The accompanying drawing is a vertical, longitudinal cross sectional view of a particle detection tube showing the coating on the window.

DETAILED DESCRIPTION OF THE PREFERRED EMBODIMENT

The drawing shows a Geiger-Muller tube 10 comprising a cylindrical metallic case 12 which functions as the cathode of the tube 10 and an end member 14 with an electrical insulator 16 fitted therein along the central axis of the case 12. Fitted to the end opposite the end member 14 is a beta radiation transparent window 18. The window 18 of the preferred embodiment depicted herein comprises a thin section of mica 20 to which a coating 22 that is opaque to ultraviolet light, electrically non-conductive and transparent to beta radiation is applied as disclosed further herein. An anode 24 terminating in a bead 26 in close proximity to the window 18 is coaxially located within the case 12 and is electrically insulated from the end member 14 and case 12 by the insulator 16. The anode 24 is connected to appropriate circuitry, not shown, through the pin 28. The cathode 12 is connected to the circuitry through pin 30. The case 12 is filled with an appropriate counting gas 32. The radiation particles 34 enter the tube 10 through the window 18 and the tube 10 operates in well known fashion as heretofore explained.

Without the benefit of the coating 22 described herein, ultraviolet light may enter the tube 10 and activate it. Additionally, because the coating 22 is non-conductive there can be no arcing from the bead 26 to any part of the window 18. The preferred coating having the desired non-conductive opaque to ultraviolet light, and transparent to beta radiation qualities is a wax having the properties hereinafter disclosed. A purified mineral bituminous hydrocarbon based wax being typically 62% paraffinic and 38% asphaltenes prepared by molecular vacuum distillation of the minerial bituminous hydrocarbon is the preferred coating of this invention. This wax material has an average molecular weight of 1214 and a volume electrical resistivity of $6.31\times10^{15}$ ohms/cms$^3$. It has been found that the commercially available wax known as APIEZON W manufactured by Apiezon Products LTD., having the above properties is an appropriate material.

This material is not to be considered exhaustive and other materials having the qualities and properties disclosed are to be included within the scope of the invention.

EXAMPLE 1

The mica window of a type 7840 beta particle detector was cleaned with the chlorinated solvent trichloroethylene using a cotton swab and then blown dry with air. The window was rinsed with isopropyl alcohol and again blown dry. The exterior surface of the mica window was then flooded with one to two milliliters of trichloroethylene. To obtain a very thin coating on the mica, four milligrams of APIEZON W wax was dissolved in the trichloroethylene on the surface of the window. The tube was rotated while the solvent evaporated resulting in a smooth thin coat of wax on the mica. The thickness was such that the anode and insulator were just visible to the eye yet remained opaque to ultraviolet light. With a potential gradient of approximately 1400 volts across the tube anode and cathode no arcing to the window was evident.

EXAMPLE 2

To obtain a very thick coating the same steps as set forth in Example 1 were followed except 20 milligrams of APIEZON W wax were dissolved in 1 to 2 milliliters of the solvent rather than 4 milligrams. This coating was very thick and opaque to visible as well as ultraviolet light yet still exhibited the necessary transparency to beta radiation and resistance to arcing.

While trichloroethylene was used as the solvent, any hydrocarbon or chlorinated solvent that will dissolve the wax may be used. The paraffinic/asphaltene wax disclosed herein is dissolvable in either hydrocarbon or chlorinated solvents. Suitability of the solvent can be determined by a simple solvency test of mixing the wax and solvent and observing whether the wax is dissolved. Toluene has also been used as the solvent successfully. Evaporation of the solvent is accomplished without the addition of heat and allowed to take place preferably at room temperature level.

Having described the preferred embodiment of the invention other embodiments and modifications of the invention will readily come to the mind of one skilled in the art having the benefit of the teachings presented in the foregoing description and drawing. It is therefore to be understood that this invention is not limited thereto and that said modifications and embodiments are to be included within the scope of the appended claims.

What is claimed is:

1. In a radiation detection tube comprising an electrically conducting cylindrical case, an end member attached to one end of said case closing said end of said case, an insulator fitted to said end member, an anode extending coaxially through said insulator and said case, a radiation transparent mica window secured to the end of said case opposite said end member, an opaque to ultraviolet light radiation transparent coating on said mica window, a radiation detection gas contained within said case, wherein the improvement comprises:

said coating being electrically non-conductive preventing electrical arcing between said anode and said coating.

2. The improvement as defined in claim 1 wherein said coating is a purified mineral bituminous hydrocarbon based wax.

3. The improvement as defined in claim 2 wherein the composition of said wax is paraffinic and asphaltene.

4. The improvement as defined in claim 2 wherein said wax has an average molecular weight of 1214.

5. A method of treating the mica window of a beta radiation particle detector tube for preventing the entry of ultraviolet light into said detector tube and preventing electrical arcing to said window which comprises:

coating the exterior surface of said mica with a beta radiation transparent, opaque to ultraviolet light, electrically nonconductive material.

6. The method of treating as defined in claim 5 wherein said material is a purified bituminous hydrocarbon based wax.

7. The method of treating as defined in claim 5 which comprises the steps of:

a. cleaning the mica window with a hydrocarbon or chlorinated solvent,
b. Rinsing the mica window with isopropyl alcohol,
c. Drying the mica window,
d. Flooding the mica window with 1 to 2 milliliters of the solvent used in step a,
e. Dissolving 4 to 20 milligrams of a mineral bituminous hydrocarbon based wax in the solvent of step d on the window,
f. Rotating the tube until the solvent evaporates.

8. The method of treating as defined in claim 7 wherein the composition of said wax is paraffinic and asphaltene.

* * * * *